(12) United States Patent
Kelly

(10) Patent No.: US 7,683,507 B2
(45) Date of Patent: Mar. 23, 2010

(54) TUBULAR ELECTRICAL GENERATORS

(75) Inventor: Hugh-Peter Granville Kelly, Westcliff on Sea (GB)

(73) Assignee: Trident Energy Limited, London (GB)

( * ) Notice: Subject to any disclaimer, the term of this patent is extended or adjusted under 35 U.S.C. 154(b) by 280 days.

(21) Appl. No.: 11/793,992

(22) PCT Filed: Jan. 11, 2006

(86) PCT No.: PCT/GB2006/000082
§ 371 (c)(1), (2), (4) Date: Sep. 4, 2007

(87) PCT Pub. No.: WO2006/075147
PCT Pub. Date: Jul. 20, 2006

(65) Prior Publication Data
US 2008/0084121 A1   Apr. 10, 2008

(30) Foreign Application Priority Data
Jan. 11, 2005   (GB) ................... 0500507.9

(51) Int. Cl.
*H02K 41/00* (2006.01)
(52) U.S. Cl. .................. 310/12.12; 310/12.25
(58) Field of Classification Search ... 310/12.12–12.13, 310/12.21, 12.22, 12.24, 12.26, 12.33, 12.25
See application file for complete search history.

(56) References Cited

U.S. PATENT DOCUMENTS

| 3,828,211 | A  |   | 8/1974  | Laronze |
| 4,590,411 | A  | * | 5/1986  | Kelly ..................... 318/687 |
| 4,868,431 | A  | * | 9/1989  | Karita et al. ............ 310/12.24 |
| 5,091,665 | A  | * | 2/1992  | Kelly ..................... 310/12.19 |
| 5,347,186 | A  | * | 9/1994  | Konotchick ............... 310/17 |
| 5,399,930 | A  | * | 3/1995  | Culp ...................... 310/328 |
| 5,909,066 | A  |   | 6/1999  | Nanba et al. |
| 6,476,524 | B1 | * | 11/2002 | Miyamoto et al. ....... 310/12.19 |
| 7,288,860 | B2 | * | 10/2007 | Cheung et al. .......... 310/12.12 |

FOREIGN PATENT DOCUMENTS

DE   19 12 251   11/1979
WO   02/13211    2/2002

OTHER PUBLICATIONS

International Search Report mailed Mar. 15, 2006.
Written Opinion.

* cited by examiner

*Primary Examiner*—Thanh Lam
(74) *Attorney, Agent, or Firm*—Nixon & Vanderhye P.C.

(57) ABSTRACT

A tubular linear generator comprises an elongate translator, containing a series of permanent magnets and one or more annular coils (not shown) contained within and affixed to a ferromagnetic sleeve. Relative movement between the translator and armature causes the generation of electricity in the coils. The sleeve is contoured in terms of permeability around its circumference at one or both its ends, as shown at, in order to reduce cogging forces between the sleeve and the permanent magnets along the translator.

7 Claims, 4 Drawing Sheets

TUBULAR ELECTRICAL GENERATORS

This application is the U.S. national phase of International Application No. PCT/GB2006/000082 filed 11 Jan. 2006 which designated the U.S. and claims priority to GB0500507.9 filed 11 Jan. 2005, the entire contents of each of which are hereby incorporated by reference.

The present invention relates to improvements to the performance of tubular linear electrical generators.

Tubular generators to which the improvements disclosed herein can be applied are of the kind whereof the armature of the generator contains one or more annular coils and the translator contains an elongate series of magnetic poles. This latter series may be formed from a number of permanent magnets arranged in a column for passing concentrically to and fro through the annular coil(s). As the lines of flux emanating from the magnetic poles cut the turns of the annular coils, electricity is generated. An example of one such construction, now in world wide use, is the tubular linear electric motor, UK Patent Number GB 2079068 and foreign equivalents.

(It should be noted throughout this text that the term armature refers to the part of the generator containing its coils, and the term, translator the part containing the permanent magnets. Electricity is generated as a consequence of movement of the one relative to the other. In addition, as is commonly known by those expert in the field, a permanent magnet electric generator of the kind described can operate equally as an electric motor. Therefore the terms generator and motor are deemed interchangeable within this application.)

There are an increasing number of industrial applications which require the conversion of reciprocating mechanical energy to electrical power. One in particular is the conversion of sea wave energy to electricity. An example of such a sea wave energy converter is where motion of a float placed in the sea is used to cause relative motion between the armature and translator of a linear generators and thus the conversion of sea wave energy to electrical power.

It will be appreciated that in order to optimise the generation of power for a given size and cost of linear generator, it is important for the generator to be as magnetically and electrically efficient as possible. Power conversion efficiency is a particularly important consideration for wave energy converters, it being essential for enough electricity to be generated to ensure an adequate return on the initial capital investment. A significant contribution to the efficiency of any electrical motor/generator is the optimum use of magnetic field flux created therein and/or inherent to its construction.

One such means for optimising the use of magnetic flux can comprise the location of a ferromagnetic cylindrical sleeve placed coaxially over and affixed to the annular coils forming the armature. The presence of the sleeve serves to draw out the lines of flux emanating from the translator in such manner as to improve the flux linkage with the coils.

A disadvantage of using any form of ferromagnetic sleeve in a tubular permanent magnet linear generator is however the unfavourable cogging which can result. By cogging is meant unevenness of the mechanical force experienced in the direction of motion of the moving part of the generator relative to the stationary part. This arises due to the salient pole magnetic attraction effect between the discretely spaced magnetic poles of the armature and the ferromagnetic sleeve. The cogging—if severe—can cause mechanical vibration, and even breakdown, over a protracted period.

According to the invention, a linear generator is provided having an annular armature and a translator located concentrically therethrough and which are movable relative to one another along a longitudinal axis, wherein a magnetically permeable sleeve is affixed to and circumferentially surrounds the armature, the permeability of one or both ends of the sleeve being contoured around its circumference such that the variation of the longitudinal cogging force on the sleeve in its travel with the armature relative to the translator, is reduced. This reduction in cogging force is of course compared with the corresponding cogging force if the end(s) had uniform permeability.

In a preferred form, the said contouring of the sleeve permeability is achieved by a variation around the circumference of the sleeve end in the amount of material at one or both ends of the sleeve, such variation being in the form of varying absence of sleeve material at locations around the circumference of the armature. Preferably, there are a number of cycles of the variation around the circumference to reduce any tendency for the net force on the sleeve to vary in 'pitch' or 'yaw' directions (as referenced to a generator having a horizontal longitudinal axis).

One method of achieving this absence is by a varying longitudinal offset of an edge of the sleeve lengthwise of the armature it surrounds, where examples of such a variation in offset may be substantially sinusoidal, triangular or castellated. By this means, when any one or more given edges of the sleeve are attracted in a certain direction to a particular magnetic pole and/or sets of poles, other given edges are attracted less or are attracted in the opposite directional sense, the net attraction of the sleeve to any particular pole or set of poles thereby being reduced, this reduction—within margins—being obtained regardless of the position of the sleeve relative to the translator.

In practice, the contouring may follow a predetermined and continuous curve resulting in the sleeve having for example one pair of longer lengths and one pair of shorter lengths the lengths of each pair being diametrically opposite one another. Alternatively, a castellated contour may be employed. In the case where the contouring is effected at both ends of the sleeve, the overall average length of the sleeve is selected by design such that any residual cogging still remaining at one end of the sleeve is counterbalanced as far as possible by the opposing effect of any residual cogging remaining at the other end.

The use of such a magnetically permeable sleeve, while advantageously improving the flux acting on the coils, has one significant disadvantage. This is the fact that eddy currents are induced in the sleeve as it travels to and fro over the permanent magnets of the translator. This results both in a braking action, and at least as importantly, the heating of the sleeve material. This is added to the heat loss occurring within the armature coils, compromising noticeably the overall performance, whether in generator or motor mode.

According to an aspect of the invention, the sleeve includes or is constructed from a multiplicity of individual ferromagnetic elements for drawing out lines of flux from the translator, but each being of a shape and individually insulated such as to eliminate substantially the circulation of eddy currents around and/or along the circumference of the sleeve.

In a preferred embodiment of this aspect of the invention, the individual elements are formed of discrete lengths of ferromagnetic material, such as soft iron, placed parallel and adjacent to one another lengthwise so as to form the aforementioned sleeve. The lengths may be bonded to one another by a suitable resin or the like. The individual elements may be manufactured from a ferromagnetic material having especially favourable magnetic permeability properties, such as 'TRAPOFERM'.

In another embodiment, the elements may comprise individual particles, such as small ball bearings, embedded within a non-conducting plastics material.

The combination of the foregoing arrangements results in a linear generator capable of operation substantially without any inherent detrimental cogging or braking forces and with little or no heat losses within its sleeve. Overall, this can result in a performance increase exceeding 30% as compared to generators (or motors) operating without a sleeve constructed in accordance with this invention.

It is practical when building the translator of a tubular linear generator to select different grades of permanent magnets according to the desired performance. For example, where a high output is required, and cost is certainly no object, rare earth neodymium boron iron magnets may be used. The coercivity of these magnets is high and there is little risk that demagnetising fields arising from currents circulating in the armature coils can bring the magnets to an unfavourable working point. On the other hand, if lower coercivity ceramic magnets are used, for example those known as ferrites, they may suffer from this effect owing to the presence of a distinct knee in their BH curve properties. Use of a ferromagnetic sleeve as described herein mitigates this risk, owing to the fact that it assists magnetic coupling from the North/South poles of the permanent magnets positioned along the translator. (In effect, the sleeve forms a magnetic short circuit path for the magnet fields to travel along.)

It will be apparent however that the sleeve serves this purpose with more effect where it extends well beyond either side of an armature coil, than where it just covers such a coil, for example where the sleeve at its longest length is made to the exact overall length of the annular armature coils and thus covers the end coils of the armature on their inside face only.

According to a feature of the invention, the length of the ferromagnetic sleeve is made to a length sufficiently exceeding that of the total longitudinal length of the stack of armature coils such that the overlap resulting at each end of the stack ensures protection against induced demagnetisation of the magnets is afforded substantially to the same extent to the translator magnets exposed to the coils situate at the extreme ends of the armature as to those at its centre.

It is known in the construction of tubular linear generators or motors for the annular coils thereof to be impregnated with resin. The purpose of this is to hold the coils in position relative to one another and to provide a heat conducting path to an outside heat conducting surface. However, were such a construction to be used in tubular linear generators the subject of the improvements disclosed herein, it would be appreciated that the radial distance of the sleeve from the magnets it coaxially surrounds would be augmented by the thickness of the resin layer. In practice, in order to afford the best possible magnetic coupling between the sleeve and the magnets, it is desirous to keep this radial distance as small as possible.

According to a further feature of the invention, the individual elements comprising the ferromagnetic sleeve are embedded within the resin bonding the coils during the manufacturing process. By this means, the ferromagnetic sleeve formed by the elements is enabled to be as close as possible to the outside diameter of the coils, and correspondingly as near as possible to the magnetic poles of the armature.

For specific applications of tubular linear generators, and in particular the wave energy application described before, it may be desirous to be able to brake the motion of the armature relative to the translator. This might be necessary in the case of, for example, sudden and unexpected movements arising from the arrival of a freak wave. One such braking action may be conveniently achieved by short circuiting the armature coils. The electromotive forces circulating within the coils can be very effective to slow down the motion of the translator. It would be advantageous to be able to use the ferromagnetic sleeve as described herein for the same purpose, but as already described, its very design prevents the circulation in use of eddy currents.

According to yet a further feature of the invention, a number or all of the individual elements comprising or included within the sleeve are each wired by conducting means to communal switching means, permitting connection of a selected number, or all of them one to another and thus the controlled circulation of eddy currents. By this means, the sleeve may be brought into play as desired, albeit to a limited extent, as an additional braking means.

The invention will now be described with reference to the accompanying drawings in which.

Figure 1:
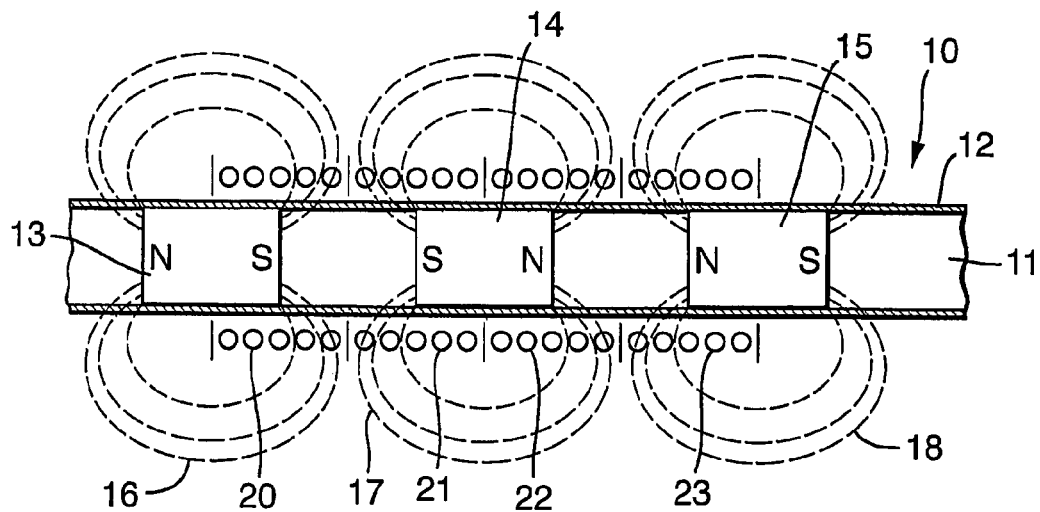
FIG. 1 shows the armature and translator of a typical tubular linear generator.
Figure 2:
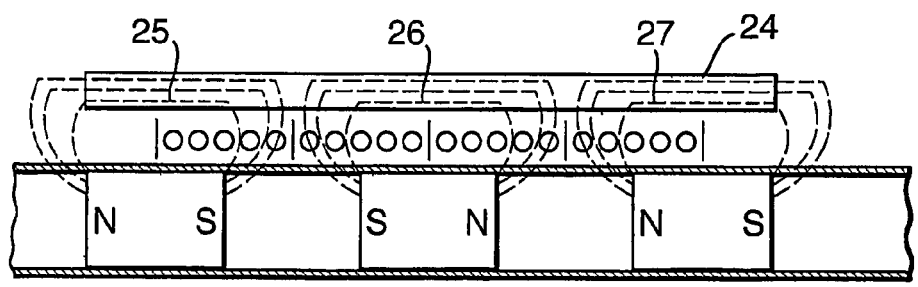
FIG. 2 is a view of one edge of a ferromagnetic sleeve surrounding the armature of the generator.

FIGS. 1 and 2 and the text describing them, provide a general reference background for assisting an understanding of the invention.

Referring to FIG. 1, a typical tubular linear generator to which the improvements disclosed herein may be applied is shown generally at 10. The translator 11 comprises a non-ferromagnetic tube 12 housing a series of spaced axially magnetised permanent magnets 13,14,15 and so on. It will be seen that like poles of the magnets face one another. The effect is to cause lines of force, shown here schematically at 16,17 & 18, to emit radially out from the tube holding the permanent magnets, and thereby cut as shown the turns of the coaxial armature coils, shown here at 20,21,22 & 23. (Note, these coils are generally bonded within a further tube, not shown here for clarity.) Forcing relative movement between the armature and translator results in the generation of sinusoidal alternating electro-motive forces in the armature coils. (This arrangement is identical to that of the tubular linear electric motor disclosed in UK patent no. GB2079068.)

As will be appreciated, the emf (electromotive force) generated in the armature coils depends on the strength of the permanent magnet fields, and, using the principle of Fleming's right hand rule, how orthogonal they are to the direction of relative motion of the turns of the armature coil(s) they are cutting.

Referring to FIG. 2, means, are shown for improving this orthogonality, and thus the amount of electricity generated. A ferromagnetic sleeve, shown here at one edge only at 24, is positioned over the coils. The effect of the sleeve is twofold. First, it assists in drawing out the lines of force more directly from the permanent magnets and thus more orthogonally from the tube holding them, and secondly, it provides a ready path for the magnetic field lines to travel along, as shown at 25, 26 and 27. This latter aspect provides an important advantage inasmuch that it assists the effective working point at which the magnets operate, and reduces the likelihood of their demagnetisation in use.

The foregoing description outlines the general—and known in the field—concept of using a sleeve to augment output, or in the case of the described configuration used as a linear motor, the thrust available therefrom were the coils to be energised. The actual concept of the invention is now described in detail with reference to the remaining figures.

Figure 3:
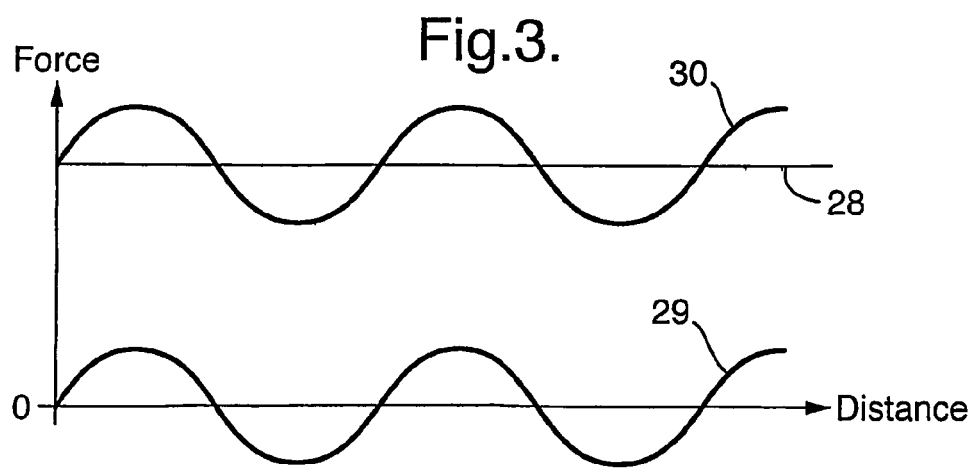
FIG. 3 shows cogging forces which may arise when using a sleeve of uniform length.

A noticeable disadvantage arises from the use of a simple ferromagnetic sleeve as depicted in FIG. 2. This is due to the effect known as cogging. By cogging is meant mechanical unevenness in the mechanical force experienced in the direction of motion of the moving part of the generator relative to the stationary part. This arises due to the salient pole magnetic attraction effect between the discretely spaced magnetic poles of the armature and the ferromagnetic sleeve. (It can be seen, from reference to FIG. 2, that the sleeve will try and align itself lengthwise relative to the magnets to provide the best possible path for their magnetic fields, as is well known when bringing any ferromagnetic object into proximity with permanent magnets.) Cogging can result in a juddering motion with consequent deleterious mechanical effects. Such a cogging profile is shown at FIG. 3. The applied force is shown at 28, the cogging force at 29 and the resultant force at 30.

Figure 4:
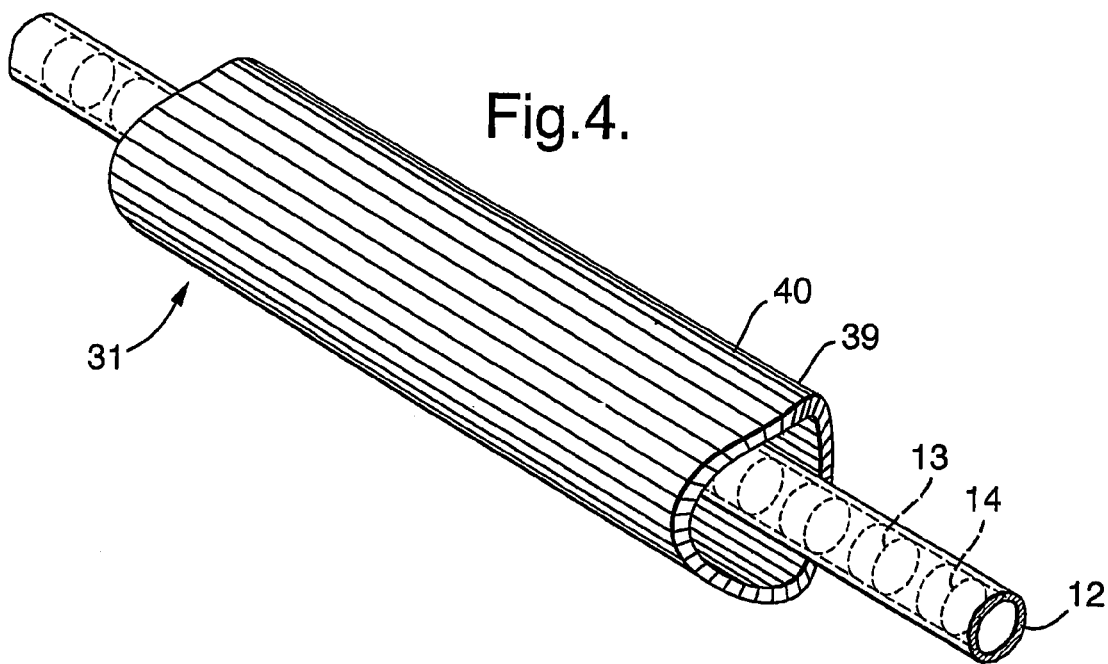
FIG. 4 is a perspective view of the sleeve with contoured ends.

Referring to FIG. 4, means are shown to mitigate this effect. The sleeve surrounding the armature coils is shown here at 31, and is formed from a number of discrete elements—the full purpose of which is described hereafter. As can be seen, the sleeve is modified in shape at its ends as shown at 32. Rather than having a uniform perimeter at its end, the ends are instead contoured as shown. The contour achieves the effect, as illustrated, of the top and bottom portions of the sleeve extending on its right hand side more than its side portions. This is achieved in manufacture simply by suitable juxtaposition of the individual elements making up the sleeve. The purpose of the contouring is to reduce the cogging forces. (Note, on the left hand side of the sleeve, the side portions extend conversely more than the top and bottom portions.)

Figure 5:
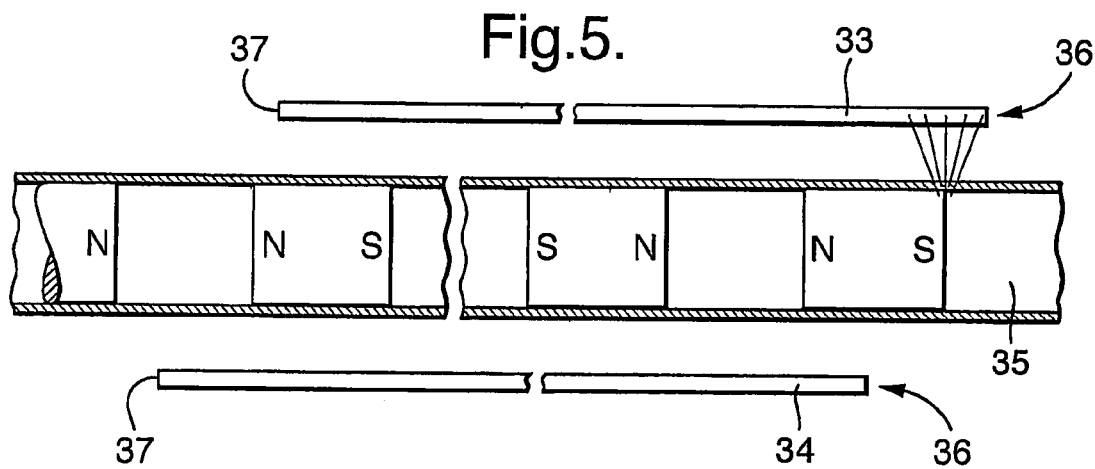
FIG. 5 shows the method by which cogging forces may be reduced.

This is further explained with reference to FIG. 5. The top (and in this case the most protruding) portion of one end of the sleeve is shown schematically at 33 and the side, and least protruding portion, at 34. The translator is shown at 35. The overlap of the elements 33 and 34 is so selected that while one length is trying to pull to one set of magnet poles, the other length is in an 'in between' state and therefore not contributing towards this force. As the armature is caused to move relative to the translator, so the position is reversed. Meanwhile the gradual contouring of the sleeve end assists this process. The effect, at this end of the sleeve, is to reduce the net cogging force.

Figure 6:
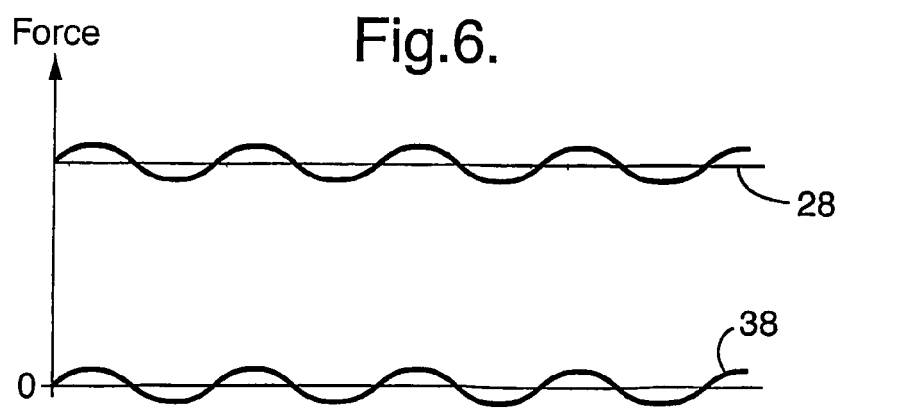
FIG. 6 shows such reduced cogging forces.

At the other end of the sleeve, 37, a similar arrangement prevails, except that the relative protrusions of the element lengths are so predetermined (by careful selection of their physical length) that their action at this other end is out of phase to those at the first end 36, see also for reference both left hand and right hand ends of the sleeve of FIG. 4. This further reduces the cogging effect, the final net force being substantially reduced, as shown at 38 in FIG. 6, in comparison with the amplitude of the original shown at FIG. 3. Alternative sleeve end profiles are possible, such as a combination of a castellated contour, combined with gradual curves, to even further reduce the cogging effect.

An important aspect of the invention will now be described. It will be seen from the sleeve shown at FIG. 4, that this is formed from a number of discrete elements. The reason for this is as follows.

Were any such sleeve to be constructed from a solid conductive material (as is the case with a simple ferromagnetic cylinder) this would suffer from a significant disadvantage. This is that during generation, the very motion of the sleeve relative to the translator, creates parasitic eddy currents circulating therein. These serve both to heat the sleeve and, at least as bad, to resist the passage of the armature relative to the translator owing to the magnetic fields set up by them. These result in a counter force opposing the very force causing the movement. The effect can be reduced to some extent by punching slots in the sleeve but this reduces the effectiveness of the sleeve by the very omission of the material their presence necessitates.

The sleeve of FIG. 4, formed in accordance with the invention, and also overcoming the said difficulties caused by circulating eddy currents, is shown in outline at 31. This comprises a multiplicity of elongate discrete elements 39, 40 and so on, each made from a ferromagnetic material having a favourable high permeability, such as soft iron or 'TRAPOFERM'. Each of these elements is insulated from its neighbour. The elements continue to draw out the lines of force, substantially as though the sleeve were made from a single piece, but because they are insulated from one another, this eliminates virtually altogether the circulation of eddy currents, their presence being confined to within the longitudinal elements. Thus a significant benefit arises in terms of output but without any noticeable impact due to eddy currents.

Figure 7:
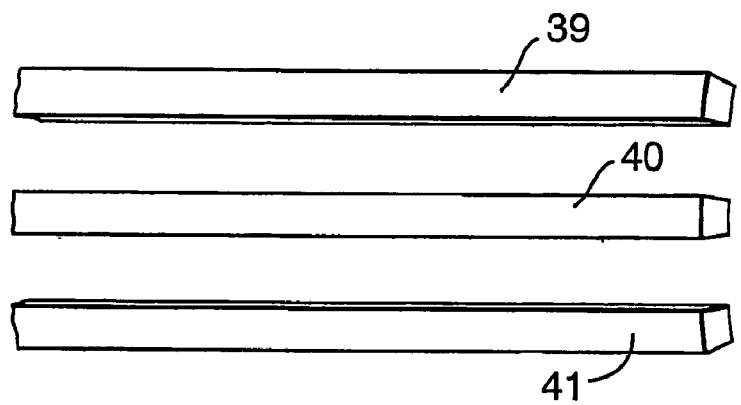
FIG. 7 is an exploded view of the individual elements comprising the sleeve.

FIG. 7 shows an expanded view of part of the sleeve shown in FIG. 2b. The discrete longitudinal elements making up the sleeve are shown again here at 39,40 and 41. Each element is insulated along its entire length to prevent electrical conduction to its neighbour.

Figure 8:
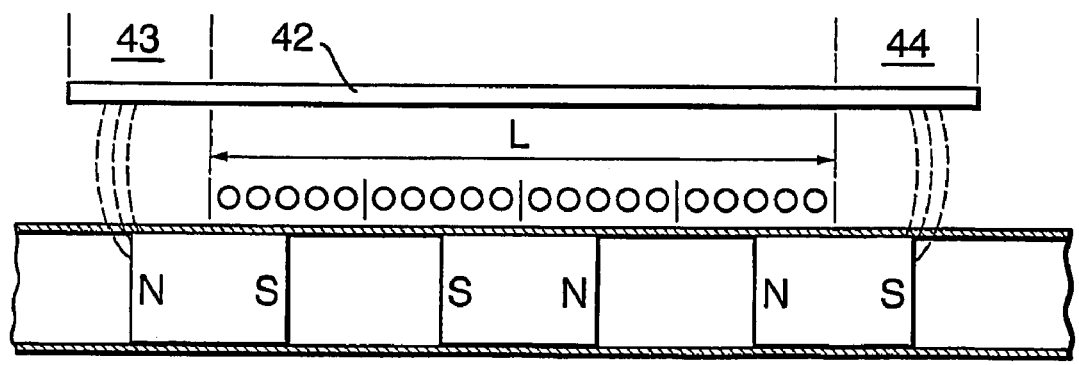
FIG. 8 shows an elongate sleeve overlapping the coils of the generator.

Referring to FIG. 8, an arrangement is shown at 42 for further reducing the likelihood of the magnets within the translator being taken beyond their safe operating point. (This may occur due to the presence of strong demagnetising fields or—in combination—exposure of the magnets to such fields and operation at high temperatures.)

As mentioned before, the presence of the sleeve of the invention assists the safe operation of the magnets inasmuch that it provides a ready path along which their fields can travel. However, were the (average) length of the sleeve to be made such that it only just covered the end coils of the armature, the magnets coaxially surrounded by them would not be protected to the same extent as those more centrally placed. The sleeve therefore is made to a length exceeding by a good margin as shown at 43 and 44 the overall length 'l' of the armature coil stack. By this means, the magnetic field coupling provided by the sleeve can be seen to extend well over all of the operative magnets so assisting their function within a safe operating point.

Figure 9:
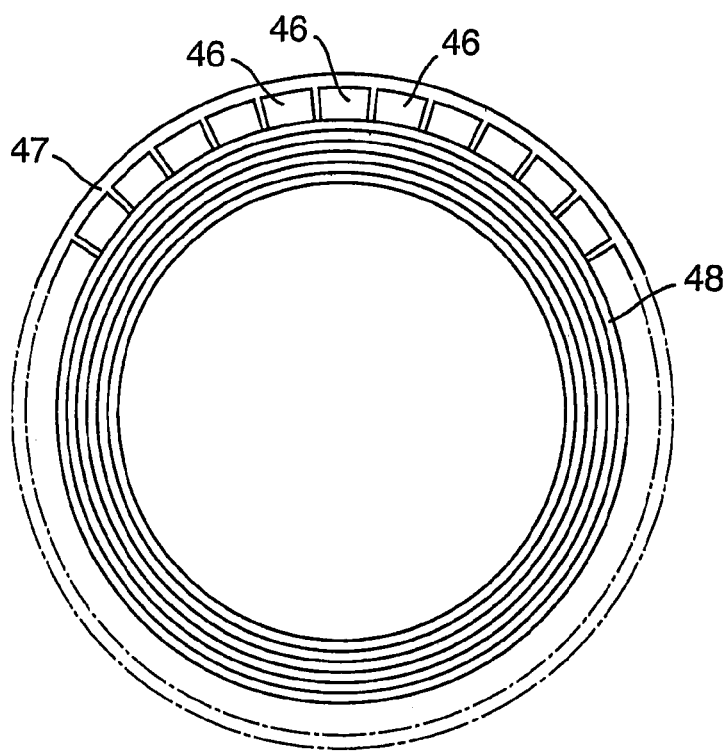
FIG. 9 is a diagram showing the elements comprising the sleeve embedded in resin and FIG. 10 shows means for enabling the sleeve to act as an electromagnetic brake.

It is well known to maximise magnetic coupling within electromagnetic machinery by reducing magnetic air gaps as far as is practicable. An arrangement for achieving this in the case of the sleeved tubular linear generator is now shown with reference to FIG. 9, which shows an end view of the coils and sleeve. It is customary to encapsulate coils in resin for their protection and bonding. Rather than assembling the individual elements 46 comprising the sleeve over the (hardened) resin, which would result in an increased air gap, they are instead moulded within it, as shown at 47. By this means, they are as close as practically possible to the coil surface 48, and thus the magnetic flux coupling with the translator magnets is maximised.

It is well known that short circuiting the armature coils of a permanent magnet type rotary electric motor is effective to brake the motion of its armature. In the case of the tubular linear generator, short circuiting its armature coils similarly provides a ready and effective braking action of the motion of the translator relative to its armature. From the foregoing description however, it will be understood that the sleeve cannot contribute to this effect as the very point of its construction is to avoid the effect of circulating eddy currents.

However, in special circumstances, it may be useful to be able to arrest motion in the shortest possible time, particularly in wave energy converters where for example there may be the sudden arrival of a wave of unexpected amplitude.

This might for example, cause undue motion of a point absorber driving a linear generator, with consequent damage to the latter.

Figure 10:
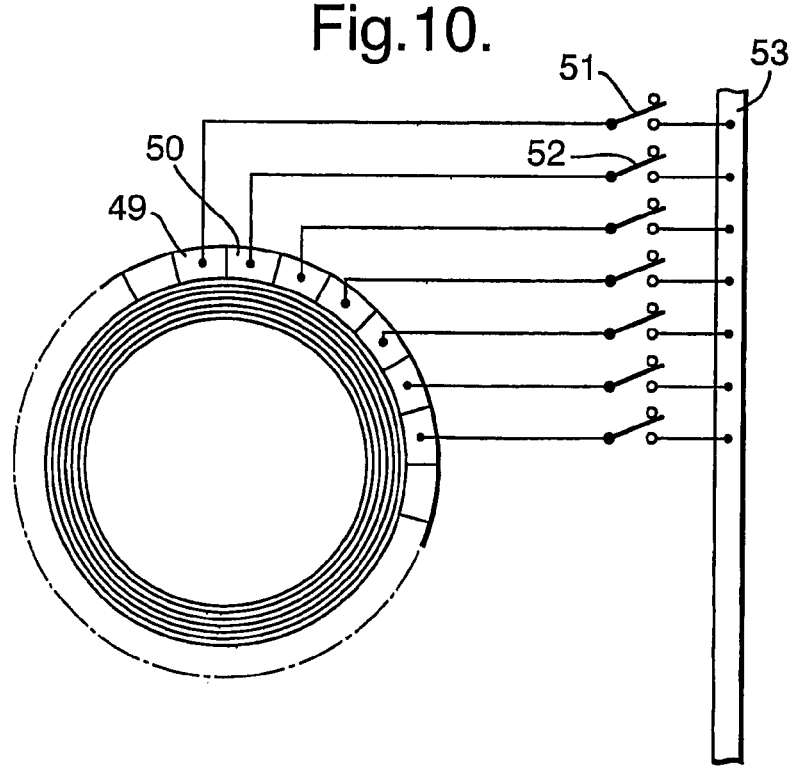

A method of enabling the sleeve still to contribute to the braking effect is shown with reference to FIG. 10. Each of the elements 49,50 and so on is each connected to corresponding switches 51 and 52 and so on. The other half of each switch is connected to a bus bar 53. By switching on some, or all, of the switches, a path is provided enabling, albeit to a limited extent, some would be eddy currents to circulate, and thus permitting the sleeve to add to the braking effort.

Numerous variations will be apparent to those skilled in the art.

The invention claimed is:

1. A linear generator having an annular armature and a translator located concentrically therethrough and which are movable relative to one another along a longitudinal axis, wherein a magnetically permeable sleeve is affixed to and circumferentially surrounds the armature, the permeability of one or both ends of the sleeve being contoured around its circumference such that the variation of the longitudinal cogging force on the sleeve in its travel with the armature relative to the translator is reduced, wherein said contouring of the permeability is achieved by a variation in the amount of material around the circumference of the sleeve end at one or both ends of the sleeve, such variation being in the form of varying absence of sleeve material at locations around the circumference of the armature, and wherein the sleeve includes or is constructed from a multiplicity of individual ferromagnetic elements for drawing out lines of flux from the translator, but each being of a shape and individually insulated such as to eliminate substantially the circulation of eddy currents around and/or along the circumference of the sleeve.

2. A linear generator according to claim 1 wherein the variation in the amount of sleeve material is achieved by a varying longitudinal offset of an edge of the sleeve lengthwise of the armature it surrounds, where examples of such a variation in offset may be substantially sinusoidal, triangular or castellated.

3. A linear generator according to claim 2 wherein both ends of the sleeve are so contoured, the offsetting of edge portions at opposite ends of a generatrix of the sleeve being such that the distance between edge portions of the ends is substantially constant around the circumference of the sleeve.

4. A linear generator according to claim 1 in which the individual elements consist of discrete lengths of ferromagnetic material, such as soft iron, each insulated from its neighbour and placed parallel and adjacent to one another so as form the armature sleeve.

5. A linear generator according to claim 1 in which the elements comprise individual particles, such as small ball bearings or iron crystals, embedded within a plastics material.

6. A linear generator according to claim 1 in which a number or all of the individual elements comprising or included within the sleeve are each connected by conducting means to communal switching means permitting connection of a selected proportion, or all of them, to one another and thus the controlled circulation of eddy currents.

7. A linear generator according to claim 1, in which the length of the sleeve, at its minimum, exceeds the longitudinal length of the armature by an extent sufficient to ensure substantially the same degree of protection against induced demagnetisation of the translator magnets is afforded by the presence of the sleeve to the magnets exposed at each end of the armature as to those at the centre thereof.

* * * * *